United States Patent
Fwu et al.

(10) Patent No.: US 9,736,835 B2
(45) Date of Patent: Aug. 15, 2017

(54) INTERFERENCE MANAGEMENT FOR DYNAMIC UPLINK AND DOWNLINK CONFIGURATION

(71) Applicant: Intel Corporation, Santa Clara, CA (US)

(72) Inventors: Jong-Kae Fwu, Sunnyvale, CA (US); Alexey Khoryaev, Nizhny Novgorod (RU); Debdeep Chatterjee, Mountain View, CA (US); Mikhail Shilov, Nizhny Novgorod (RU); Andrey Chervyakov, Nizhny Novgorod (RU); Sergey Panteleev, Nizhny Novgorod (RU); Hong He, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/926,418

(22) Filed: Oct. 29, 2015

(65) Prior Publication Data
US 2016/0157216 A1 Jun. 2, 2016

Related U.S. Application Data

(63) Continuation of application No. 13/612,318, filed on Sep. 12, 2012, now Pat. No. 9,197,683.
(Continued)

(51) Int. Cl.
*H04W 72/04* (2009.01)
*H04L 27/26* (2006.01)
(Continued)

(52) U.S. Cl.
CPC ............ *H04W 72/044* (2013.01); *H04B 1/69* (2013.01); *H04B 7/024* (2013.01); *H04B 7/0413* (2013.01);
(Continued)

(58) Field of Classification Search
CPC .... H04B 7/024; H04B 7/0413; H04B 7/0456; H04B 7/0617; H04B 7/0639
(Continued)

(56) References Cited

U.S. PATENT DOCUMENTS 6,741,579 B1 * 5/2004 Choi .................... H04B 7/2643
370/337
9,197,683 B2 11/2015 Fwu et al.
(Continued)

FOREIGN PATENT DOCUMENTS

KR 100902864 B1 6/2009
WO WO-2013112665 A1 8/2013

OTHER PUBLICATIONS

"U.S. Appl. No. 13/612,318, Examiner Interview Summary mailed Jan. 8, 2015", 3 pgs.
(Continued)

*Primary Examiner* — Jae Y Lee
*Assistant Examiner* — Jean F Voltaire
(74) *Attorney, Agent, or Firm* — Schwegman Lundberg & Woessner, P.A.

(57) ABSTRACT

An apparatus and method for managing interference to facilitate allocation of a dynamic uplink and downlink configuration are disclosed herein. Determining whether a first cell causes interference less than a pre-determined threshold level to one or more neighboring cells or whether flexible subframes of radio frames associated with the one or more neighboring cells operate as downlink subframes. In response to the determining condition being met, allocating a first flexible subframe of a first radio frame associated with the first cell to operate as a downlink subframe at normal transmit power level. In response to the determining condition not being met, allocating the first flexible subframe of the first radio frame associated with the first cell as one of
(Continued)

a downlink subframe operating in a reduced transmit power level or as an uplink subframe.

20 Claims, 12 Drawing Sheets

Related U.S. Application Data

(60) Provisional application No. 61/591,641, filed on Jan. 27, 2012.

(51) Int. Cl.

| | | |
|---|---|---|
| *H04B 1/69* | (2011.01) | |
| *H04W 72/08* | (2009.01) | |
| *H04B 7/024* | (2017.01) | |
| *H04B 7/0413* | (2017.01) | |
| *H04B 7/0456* | (2017.01) | |
| *H04B 7/06* | (2006.01) | |
| *H04W 4/00* | (2009.01) | |
| *H04W 4/08* | (2009.01) | |
| *H04L 12/18* | (2006.01) | |
| *H04L 29/06* | (2006.01) | |
| *H04L 1/18* | (2006.01) | |
| *H04L 5/14* | (2006.01) | |
| *H04W 52/02* | (2009.01) | |
| *H04W 36/00* | (2009.01) | |
| *H04L 1/00* | (2006.01) | |
| *H04W 76/04* | (2009.01) | |
| *H04L 5/00* | (2006.01) | |
| *H04W 36/04* | (2009.01) | |

(52) U.S. Cl.
CPC ......... *H04B 7/0456* (2013.01); *H04B 7/0617* (2013.01); *H04B 7/0639* (2013.01); *H04L 1/0026* (2013.01); *H04L 1/1864* (2013.01); *H04L 1/1896* (2013.01); *H04L 5/0035* (2013.01); *H04L 5/0048* (2013.01); *H04L 5/1469* (2013.01); *H04L 12/189* (2013.01); *H04L 27/2607* (2013.01); *H04L 65/4076* (2013.01); *H04L 65/608* (2013.01); *H04W 4/005* (2013.01); *H04W 4/08* (2013.01); *H04W 36/0094* (2013.01); *H04W 52/0216* (2013.01); *H04W 72/04* (2013.01); *H04W 72/042* (2013.01); *H04W 72/0406* (2013.01); *H04W 72/0493* (2013.01); *H04W 72/082* (2013.01); *H04W 72/085* (2013.01); *H04W 76/048* (2013.01); *H04L 1/0027* (2013.01); *H04L 1/0031* (2013.01); *H04L 1/1887* (2013.01); *H04L 5/0053* (2013.01); *H04W 36/04* (2013.01); *Y02B 60/50* (2013.01)

(58) Field of Classification Search
USPC ........................................................ 370/280
See application file for complete search history.

(56) References Cited

U.S. PATENT DOCUMENTS

| | | | | |
|---|---|---|---|---|
| 2006/0245398 A1* | 11/2006 | Li | .................. | H04B 7/2668 370/335 |
| 2009/0249153 A1 | 10/2009 | Zhang | | |
| 2011/0149813 A1 | 6/2011 | Parkvall et al. | | |
| 2011/0170496 A1* | 7/2011 | Fong | .................. | H04L 5/0053 370/329 |
| 2011/0176461 A1 | 7/2011 | Astely et al. | | |
| 2011/0211503 A1 | 9/2011 | Che et al. | | |
| 2012/0106404 A1* | 5/2012 | Damnjanovic | ......... | H04L 5/001 370/279 |
| 2012/0142352 A1* | 6/2012 | Zhang | .............. | H04W 36/0072 455/436 |
| 2012/0282964 A1* | 11/2012 | Xiao | .................. | H04B 7/024 455/515 |
| 2013/0084892 A1* | 4/2013 | Teyeb | .................. | H04W 4/023 455/456.6 |
| 2013/0194982 A1 | 8/2013 | Fwu et al. | | |

OTHER PUBLICATIONS

"U.S. Appl. No. 13/612,318, Final Office Action mailed Oct. 2, 2014", 21 pgs.
"U.S. Appl. No. 13/612,318, Non Final Office Action mailed Apr. 8, 2015", 17 pgs.
"U.S. Appl. No. 13/612,318, Non Final Office Action mailed Jun. 6, 2014", 21 pgs.
"U.S. Appl. No. 13/612,318, Notice of Allowance mailed Jul. 21, 2015", 12 pgs.
"U.S. Appl. No. 13/612,318, Response filed Jan. 2, 2015 to Final Office Action mailed Oct. 2, 2014", 11 pgs.
"U.S. Appl. No. 13/612,318, Response filed Jul. 8, 2015 to Non Final Office Action Mailed Apr. 8, 2015", 11 pgs.
"U.S. Appl. No. 13/612,318, Response filed Sep. 8, 2014 to Non Final Office Action mailed Jun. 6, 2014", 9 pgs.
"International Application Serial No. PCT/US2013/022858, International Preliminary Report on Patentability mailed Aug. 7, 2014", 7 pgs.
"International Application Serial No. PCT/US2013/022858, International Search Report mailed May 30, 2013", 4 pgs.
"International Application Serial No. PCT/US2013/022858, Written Opinion mailed May 30, 2013", 5 pgs.
Alcatel, Lucent, et al., "TDD DL-UL Reconfiguration Study Item", 3GPP TSG-RAN-WG4 Meeting R4-114063, (Aug. 2011), 4 pgs.
Catt, "Remaining issues for transmission of aperiodic SRS", 3GPP TSG RAN WG1 Meeting R1-110053, (Jan. 2011), 4 pgs.
Panasonic, "Issues on TDD different DL/UL configurations on different bands for Rel-11", 3GPP TSG-RAN WG1 Meeting R1-112358, (Aug. 2011), 2 pgs.
"European Application No. 13740705.2, Extended European Search Report mailed Aug. 17, 2015", 11 pgs.
David, Lopez-Perez, et al., "Enhanced intercell interference coordination challenges in heterogeneous networks", IEEE Wireless Communications, IEEE Service Center, Piscataway, NJ, US, vol. 18, No. 3, 1, XP011367615, ISSN: 1536-1284, DOI: 10 .1109/MWC.2011.5876497, (Jun. 1, 2011), 22-30.
Motorola, "Text Proposal for FDD HeNB Control Interference Mitigation", 3GPP DRAFT; R4-094033, 3rd Generation Partnership Project (3GPP), Mobile Competence Centre ; 650, Route Des Lucioles ; F-06921 Sophia-antipolis Cedex ; France, no. Miyazaki; Oct. 12, 2009, , XP050393590,, (Oct. 12, 2009), 1-4.
Samsung, "preliminary evaluation of TDD UL-DL reconfiguration performance", 3GPP DRAFT; RI-112525 Performance of TDD Uplink-Downlink Reconfiguration, 3rd Generation Partnership Project (3GPP), Mobile Competence Centre; 650, Route Des Lucioles ; F-06921 Sophia-Antipolis Cedex ; France, vol. RAN WG1, no. Athens, Greece; Aug. 22, 2011,, (Aug. 16, 2011).

* cited by examiner

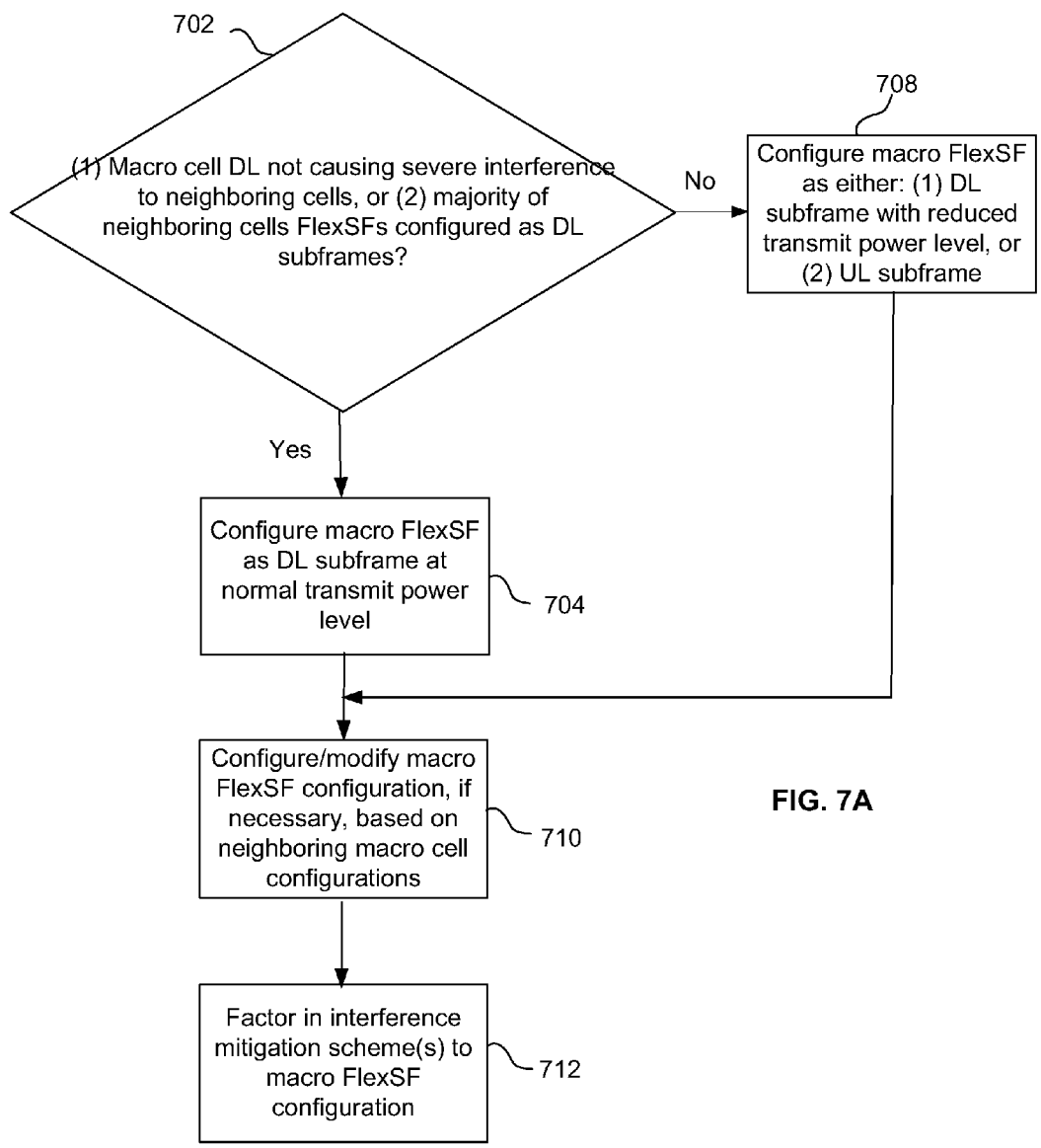

INTERFERENCE MANAGEMENT FOR DYNAMIC UPLINK AND DOWNLINK CONFIGURATION

CROSS-REFERENCE TO RELATED APPLICATIONS

This application is a continuation of U.S. patent application Ser. No. 13/612,318 entitled "Interference Management for Dynamic Uplink and Downlink Configuration" filed on Sep. 12, 2012, which claims priority to U.S. Provisional Patent Application No. 61/591,641 entitled "Advanced Wireless Communication Systems and Techniques" filed on Jan. 27, 2012, the content of which is incorporated herein by reference in its entirety.

TECHNICAL FIELD

The present disclosure relates generally to wireless communications. More particularly, the present disclosure relates to changing uplink and downlink ratio configurations within wireless communication systems.

BACKGROUND

In the current 3rd Generation Partnership Project (3GPP) long term evolution (LTE) time division duplex (TDD)-Advanced systems, the same frequency bands are used for the uplink and downlink transmissions between enhanced node Bs (eNodeBs) and user equipment (UE). Uplink and downlink transmissions are separated by transmitting either uplink data or downlink data at each pre-determined block of time, known as subframes, on the same frequency bands. In TDD deployment, the uplink and downlink transmissions are structured into radio frames, each 10 ms in time length. Each radio frame may comprise a single frame or two half-frames of each 5 ms in time length. Each half-frame, in turn, may comprise five subframes of 1 ms time length each. Particular designations of subframes within a radio frame for uplink or downlink transmission—referred to as uplink and downlink configurations—can be defined. The seven supported uplink and downlink configurations (also referred to UL/DL configurations, uplink-downlink configurations, or uplink-downlink ratio configurations) are shown in a table 100 of FIG. 1, in which "D" denotes a subframe reserved for downlink transmission, "U" denotes a subframe reserved for uplink transmission, and "S" denotes a special subframe which includes the downlink pilot time slot (DwPTS), guard period (GP) and uplink pilot time slot (UpPTS) fields. (See 3GPP TS 36.211 Version 10.5.0, E-UTRA Physical Channels and Modulation (Release 10), June 2012.) In the currently supported uplink-downlink configurations, between 40 to 90% of the subframes within a given radio frame are downlink subframes.

The evolved universal terrestrial radio access network (EUTRAN) decides which one of the supported uplink-downlink configurations applies for a given cell in the network with the underlying assumption that all cells within the network change the TDD UL/DL configuration synchronously. Once the uplink-downlink configuration has been allocated, this configuration is typically not changed during normal operation of the cell or cells served by the enhanced Node B (eNodeB). This is the case even when uplink or downlink transmission loads are mismatched to the current uplink-downlink configuration. Even if the uplink-downlink configuration for a given eNodeB is desirous of being changed, there is a minimum latency of 640 ms under the current standard to effect modification of the System Information Block 1 (SIB1) information—the mechanism by which the uplink-downlink configuration is allocated and re-allocated. Current 3GPP LTE-Advanced systems do not support dynamic adjustment of the uplink and downlink ratio configurations.

Even when the LTE system is capable of dynamic adjustment of the uplink and downlink ratio configurations, care should be taken to ensure that such feature does not introduce network inefficiencies or degrade signal quality as a result of the impact from inter-cell DL-UL interference that may potentially negate the benefits of adapting the UL/DL configurations to match possibly different traffic conditions in respective cells.

BRIEF DESCRIPTION OF THE DRAWINGS

FIGS. 7A-7B illustrate flow diagrams representative of interference management principles/rules applicable to each cell within a homogeneous or heterogeneous LTE-TDD network according to some embodiments.

DETAILED DESCRIPTION

The following description is presented to enable any person skilled in the art to create and use a computer system configuration and related method and article of manufacture to dynamically adjust the uplink-downlink configuration by any eNodeB within a wireless communications network using an indication mechanism that does not involve modification of the system information block 1 (SIB1). Interference management principles/rules are implemented during the dynamic uplink-downlink configuration determination to facilitate adjustment of the uplink or downlink transmission direction of pre-designated subframe(s) within a radio frame—referred to as flexible subframe(s)—at a subframe and/or frame level according to some embodiments. The interference management principles/rules are applicable to homogeneous and heterogeneous wireless communications networks (e.g., LTE-TDD networks). Interference management principles/rules comprise a first set of principles/rules pertaining to macro eNodeBs and a second set of principles/rules pertaining to femto/pico eNodeBs.

Various modifications to the embodiments will be readily apparent to those skilled in the art, and the generic principles defined herein may be applied to other embodiments and applications without departing from the scope of the invention. Moreover, in the following description, numerous details are set forth for the purpose of explanation. However, one of ordinary skill in the art will realize that embodiments of the invention may be practiced without the use of these specific details. In other instances, well-known structures and processes are not shown in block diagram form in order not to obscure the description of the embodiments of the invention with unnecessary detail. Thus, the present disclosure is not intended to be limited to the embodiments shown, but is to be accorded the widest scope consistent with the principles and features disclosed herein.

The interference management scheme described herein to effectively support dynamic uplink-downlink (UL/DL) configuration is applicable to homogeneous and/or heterogeneous wireless communications network deployments. Example homogeneous and heterogeneous network deployments are illustrated respectively in FIGS. 2 and 3.

Figures 1, 2:
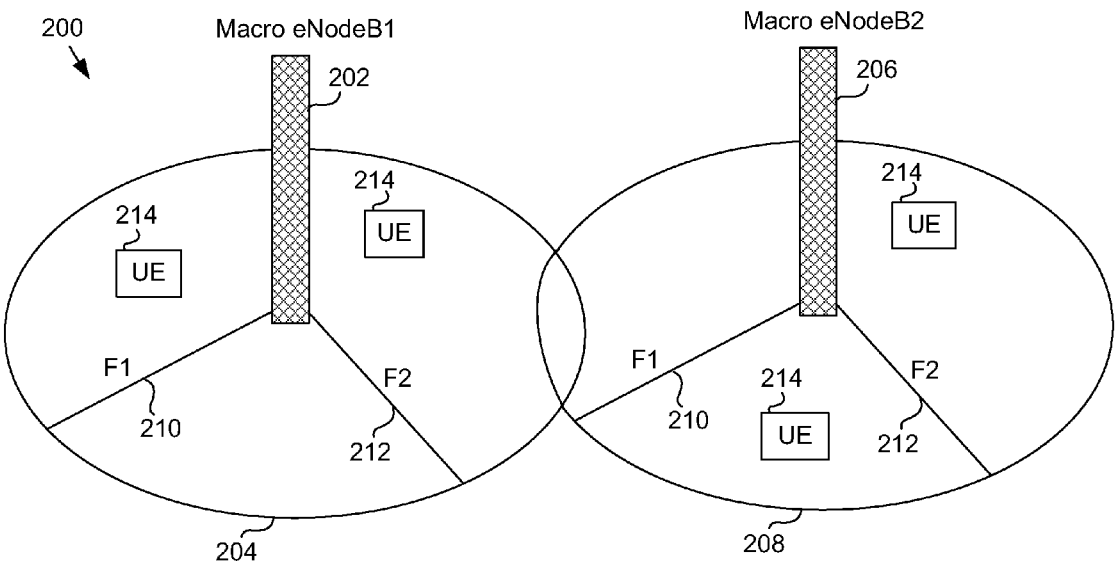
FIG. 1 illustrates supported uplink-downlink ratio configurations under the current 3GPP LTE TDD-Advanced standard.
FIG. 2 illustrates an example (portion) of a wireless communications network shown in a homogenous network deployment according to some embodiments.

FIG. 2 illustrates an example (portion) of a wireless communications network 200 shown in a homogeneous network deployment according to some embodiments. In one embodiment, the wireless communications network 200 comprises an evolved universal terrestrial radio access network (EUTRAN) using the 3rd Generation Partnership Project (3GPP) long term evolution (LTE) standard and operating in time division duplexing (TDD) mode. The wireless communications network 200 includes a first macro enhanced Node B (eNodeB or eNB) 202 and a second macro eNodeB 206.

The first macro eNodeB 202 (also referred to as eNodeB1, a first base station, or a first macro base station) serves a certain geographic area that includes at least a first (macro) cell 204. A plurality of UEs 214 located within the first cell 204 is served by the first macro eNodeB 202. The first macro eNodeB 202 communicates with the UEs 214 on a first carrier frequency 210 (F1) and optionally, one or more secondary carrier frequencies, such as a second carrier frequency 212 (F2).

The second macro eNodeB 206 is similar to the first macro eNodeB 202 except it serves a different cell from that of the first macro eNodeB 202. The second macro eNodeB 206 (also referred to as eNodeB2, a second base station, or a second macro base station) serves another certain geographic area that includes at least a second (macro) cell 208. The plurality of UEs 214 located within the second cell 208 is served by the second macro eNodeB 206. The second macro eNodeB 206 communicates with the UEs 214 on the first carrier frequency 210 (F1) and optionally, one or more secondary carrier frequencies, such as the second carrier frequency 212 (F2).

The first and second cells 204, 208 may or may not be immediately co-located next to each other. However, the first and second cells 204, 208 are situated close enough to be considered neighboring cells, such that the user traffic pattern and UL/DL configuration of one of the first or second cells 204, 208 may be relevant to the other cell. For example, one of the UE 214 served by the first eNodeB 202 may move from the first cell 204 to the second cell 208, in which case a hand-off takes places from the first eNodeB 202 to the second eNodeB 206 with respect to the particular UE 214. As another example, the respective coverage areas of the first and second cells 204, 208 may overlap with each other (e.g., first and second cells 204, 208 are overlapping or non-isolated cells). Further, the inter-cell interference characteristics can be affected by the UL/DL configurations in the respective cells. As still another example, the respective coverage areas of the first and second cells 204, 208 may be distinct or isolated from each other.

The UEs 214 may comprise a variety of devices that communicate within the wireless communications network 200 including, but not limited to, cellular telephones, smart phones, tablets, laptops, desktops, personal computers, servers, personal digital assistants (PDAs), web appliances, set-top box (STB), a network router, switch or bridge, and the like. The UEs 214 can comprise Release 8, 9, 10, 11, and/or later UEs.

It is understood that the wireless communications network 200 includes more than two eNodeBs. It is also understood that each of the first and second macro cells 204, 208 can have more than one neighboring eNodeB. As an example, the first macro cell 204 may have six or more neighboring macro cells.

In one embodiment, the UEs 214 located in respective first or second cells 204, 208 transmits data to its respective first or second macro eNodeB 202, 206 (uplink transmission) and receives data from its respective first or second macro eNodeB 202, 206 (downlink transmission) using radio frames comprising Orthogonal Frequency-Division Multiple Access (OFDMA) frames configured for time division duplexing (TDD) operations. Each of the radio frames comprises a plurality of uplink and downlink subframes, the uplink and downlink subframes configured in accordance with the uplink-downlink ratio configuration selected from among the supported uplink-downlink ratio configurations shown in FIG. 1 (see 3GPP TS 36.211 Version 10.5.0, E-UTRA Physical Channels and Modulation (Release 10), June 2012) or dynamically configured using flexible subframes as described in detail below.

Figure 3:
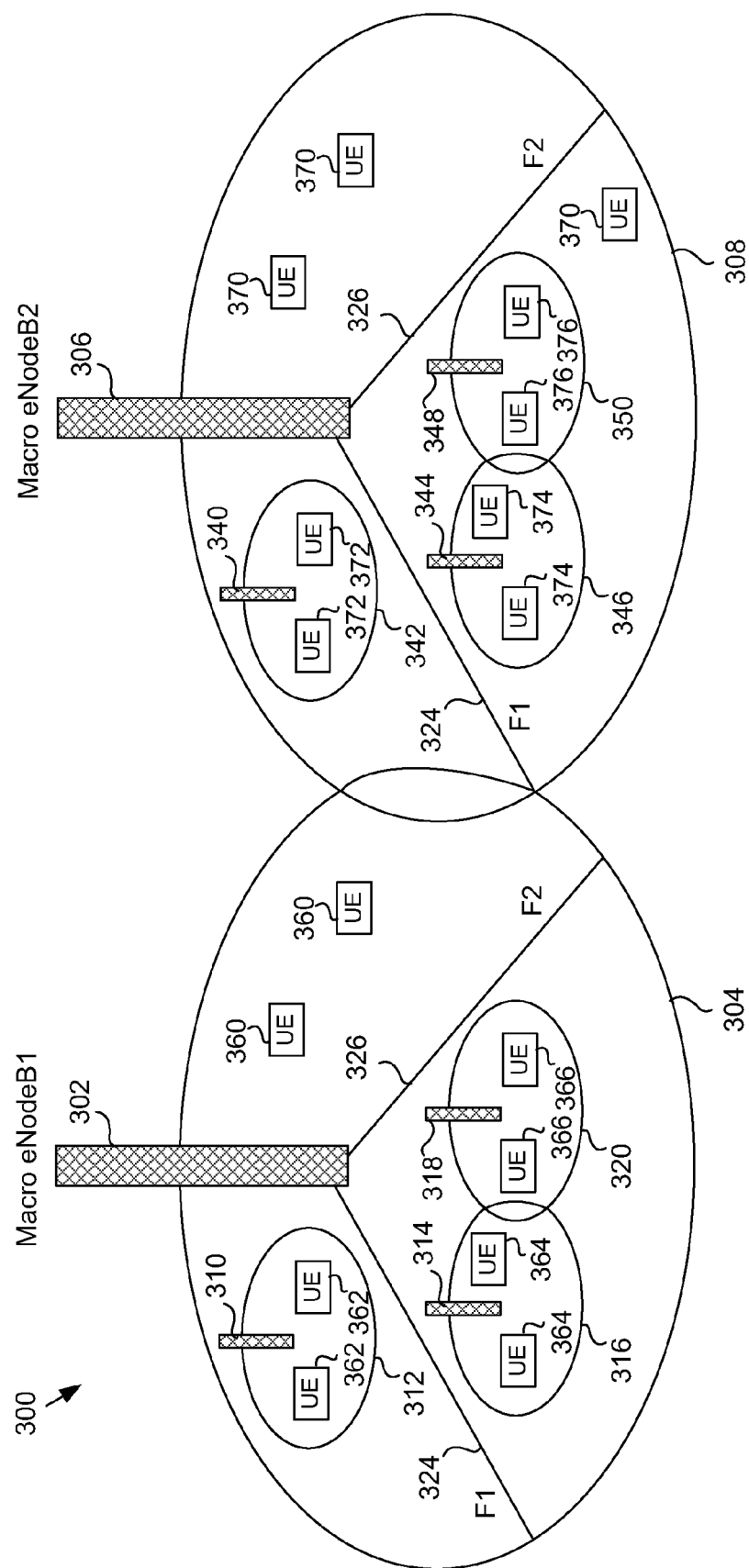
FIG. 3 illustrates an example (portion) of a wireless communications network shown in a heterogeneous network deployment according to some embodiments.

FIG. 3 illustrates an example (portion) of a wireless communication network 300 shown in a heterogeneous network deployment according to some embodiments. In one embodiment, the wireless communications network 300 comprises a EUTRAN using the 3GPP-LTE standard operating in TDD mode. The wireless communications network 300 includes a first macro eNodeB 302, a second macro eNodeB 306, a first low power node (LPN) 310, a second LPN 314, a third LPN 318, a fourth LPN 340, a fifth LPN 344, and a sixth LPN 348.

The first macro eNodeB 302 (also referred to as eNodeB1, macro eNodeB1, base station, or macro base station) serves a certain geographic area that includes at least a first macro cell 304. A plurality of UEs 360 located within the first macro cell 304 and associated with the first macro eNodeB 302 are served by the first macro eNodeB 302. The first macro eNodeB 302 communicates with the UEs 360 on a first carrier frequency 324 (F1) and optionally, one or more secondary carrier frequencies, such as a secondary carrier frequency 326 (F2). The first macro eNodeB 302, first macro cell 304, and UEs 360 are similar to the first macro eNodeB 202, first cell 204, and UEs 214, respectively.

The second macro eNodeB 306 is similar to the first macro eNodeB 302 except it serves a different cell from that of the first macro eNodeB 302. The second macro eNodeB 306 (also referred to as eNodeB2, macro eNodeB2, base station, or macro base station) serves another certain geographic area that includes at least a second macro cell 308. A plurality of UEs 370 located within the second macro cell 308 and associated with the second macro eNodeB 306 are served by the second macro eNodeB 306. The second macro eNodeB 306 communicates with the UEs 370 on the first carrier frequency 324 (F1) and optionally, one or more secondary carrier frequencies, such as the second carrier frequency 326 (F2). The second macro eNodeB 306, second macro cell 308, and UEs 370 are similar to the second macro eNodeB 206, second cell 208, and UEs 214, respectively.

Located within the geographic area of the first macro cell 304 are one or more LPNs, such as the first LPN 310, second LPN 314, and third LPN 318. The first LPN 310 serves a geographic area within the first macro cell 302, denoted as a first LPN cell 312. UEs 362 located within the first LPN cell 312 and associated with the first LPN 310 are served by the first LPN 310. The first LPN 310 communicates with the UEs 362 on the same or different frequencies as used by the first macro eNodeB 302 (e.g., first carrier frequency 324 (F1) and optionally, one or more secondary carrier frequencies, such as second carrier frequency 326 (F2)). The second LPN 314 serves a geographic area within the first macro cell 302, denoted as a second LPN cell 316. UEs 364 located within the second LPN cell 316 and associated with the second LPN 314 are served by the second LPN 314. The second LPN 314 communicates with the UEs 364 on the same or different frequencies as used by the first macro eNodeB 302 (e.g., first carrier frequency 324 (F1) and optionally, one or more secondary carrier frequencies, such as second carrier frequency 326 (F2)). The third LPN 318 serves a geographic area within the first macro cell 302, denoted as a third LPN cell 320. UEs 366 located within the third LPN cell 320 and associated with the third LPN 318 are served by the third LPN 318. The third LPN 318 communicates with the UEs 366 on the same or different frequencies as used by the first macro eNodeB 302 (e.g., first carrier frequency 324 (F1) and optionally, one or more secondary carrier frequencies, such as second carrier frequency 326 (F2)).

Located within the geographic area of the second macro cell 308 are one or more LPNs, such as the fourth LPN 340, fifth LPN 344, and sixth LPN 348. The fourth LPN 340 serves a geographic area within the second macro cell 306, denoted as a fourth LPN cell 342. UEs 372 located within the fourth LPN cell 342 and associated with the fourth LPN 340 are served by the fourth LPN 340. The fourth LPN 340 communicates with the UEs 372 on the same or different frequencies as used by the second macro eNodeB 306 (e.g., first carrier frequency 324 (F1) and optionally, one or more secondary carrier frequencies, such as second carrier frequency 326 (F2)). The fifth LPN 344 serves a geographic area within the second macro cell 308, denoted as a fifth LPN cell 346. UEs 374 located within the fifth LPN cell 346 and associated with the fifth LPN 344 are served by the fifth LPN 344. The fifth LPN 344 communicates with the UEs 374 on the same or different frequencies as used by the second macro eNodeB 306 (e.g., first carrier frequency 324 (F1) and optionally, one or more secondary carrier frequencies, such as second carrier frequency 326 (F2)). The sixth LPN 348 serves a geographic area within the second macro cell 308, denoted as a sixth LPN cell 350. UEs 376 located within the sixth LPN cell 350 and associated with the sixth LPN 348 are served by the sixth LPN 348. The sixth LPN 348 communicates with the UEs 376 on the same or different frequencies as used by the second macro eNodeB 306 (e.g., first carrier frequency 324 (F1) and optionally, one or more secondary carrier frequencies, such as second carrier frequency 326 (F2)).

Each of the LPNs 310, 314, 318, 340, 344, and 348 comprises a femto, pico, low power, or short range eNodeB (or node or base station) operating at a significantly smaller power level and communication range relative to the macro eNodeB associated with the macro cell in which it is located. The LPNs 310, 314, 318, 340, 344, and 348 may operate in accordance with commands from its respective macro eNodeB or may be capable of independent operation.

The first and second macro cells 304, 308 may or may not be immediately co-located next to each other. However, the first and second macro cells 304, 308 are situated close enough to be considered neighboring cells, such that the user traffic pattern and UL/DL configuration of one of the first or second macro cells 304, 308 may be relevant to the other macro cell. For example, one of the UE 360 served by the first macro eNodeB 302 may move from the first macro cell 304 to the second macro cell 308, in which case a hand-off takes places from the first macro eNodeB 302 to the second macro eNodeB 306 with respect to the particular UE 360. As another example, the respective coverage areas of the first and second macro cells 304, 308 may overlap with each other (e.g., first and second macro cells 304, 308 are overlapping or non-isolated cells). Further, the inter-cell interference characteristics can be affected by the UL/DL configurations in the respective cells. As still another example, the respective coverage areas of the first and second macro cells 304, 308 may be distinct or isolated from each other.

One or more of the LPN cells 312, 316, and 320 located within the first macro cell 304 may or may not be isolated cells. For example, FIG. 3 shows first LPN cell 312 as an isolated cell and each of the second and third LPN cells 316, 320 as overlapping or non-isolated cells to each other. One or more of the LPN cells 342, 346, and 350 located within the second macro cell 308 may or may not be isolated cells. For example, FIG. 3 shows fourth LPN cell 342 as an isolated cell and each of the fifth and sixth LPN cells 346, 350 as overlapping or non-isolated cells to each other.

The UEs 360, 362, 364, 366, 370, 372, 374, and 376 may comprise a variety of devices that communicate within the wireless communications network 300 including, but not limited to, cellular telephones, smart phones, tablets, laptops, desktops, personal computers, servers, personal digital assistants (PDAs), web appliances, set-top box (STB), a network router, switch or bridge, and the like. The UEs 360, 362, 364, 366, 370, 372, 374, and 376 can comprise Release 8, 9, 10, 11, and/or later UEs. The UEs 360, 362, 364, 366, 370, 372, 374, and 376 can be similar to each other and to the UEs 214. The UEs 360, 362, 364, 366, 370, 372, 374, and 376 transmit and receive data with its respective eNodeB in accordance with the selected UL/DL ratio configuration for the respective eNodeB. Although UEs 360, 362, 364, 366, 370, 372, 374, and 376 are shown associated with respective eNodeBs, it is understood that any of the UEs 360, 362, 364, 366, 370, 372, 374, and 376 can move in or out of a given cell to another cell and be associated with a different eNodeB.

It is understood that the wireless communications network 300 includes more than two macro eNodeBs. It is also understood that each of the first and second macro cells 304, 308 can have more than one neighboring cell. As an example, the first macro cell 304 may have six or more neighboring cells. It is further understood that any of the macro cells can include zero, one, two, three, or more LPNs within its area.

Each of the eNodeBs 302, 306 and LPNs 310, 314, 318, 340, 344, 348 communicates with its respective UEs in accordance with a specific UL/DL configuration. The UL/DL configuration can be the same or different among the eNodeBs 302, 306 and LPNs 310, 314, 318, 340, 344, 348 depending on pre-determined or current operating conditions. When neighboring cell(s) operate in different UL/DL configurations from each other, inter-cell interference potential increases including base station (BS)-to-BS interference and/or UE-to-UE interference. For instance, if the second and third LPNs 314, 318 operate at different UL/DL configurations from each other (e.g., either the second or third LPNs 314, 318 dynamically reconfigured its own UL/DL configuration to independently address instantaneous traffic conditions), the second LPN 314 may operate in DL mode at the same time that the third LPN 318 operates in UL mode for a given subframe within a radio frame period. Such opposing transmission directions can cause interference between the second and third LPNs 314, 318 and/or UEs 364, 366 resulting in reduced signal-to-interference-and-noise ratio (SINR) at the respective receiver(s), e.g., third LPN 318 and/or UEs 364 in this example. These new forms of interference, if not managed carefully, may cancel out the benefits from adaptive UL/DL configuration that was meant to better respond to dynamic traffic conditions in different cells.

Although each of the macro cells 204, 208, 304, 308 in FIGS. 2 and 3 is shown served by respective different eNodeBs, it is understood that the disclosure herein also applies to cases where two or more macro cells are served by a same eNodeB. In both cases, the particular (macro) eNodeB serving a given macro cell is responsible for the processing and decisions regarding the subframe configuration for the given macro cell, and that the particular eNodeB does so on a cell-by-cell basis. In this context, when phrases like, but not limited to, macro (cell) adaptation is used, it is understood that operations for carrying out the adaptation are carried out on a cell-basis and by the macro eNodeB serving the particular macro cell. This is consistent with scenarios of independent adaptation, in which cell adaptation is performed without coordination or synchronization between neighboring cells. Similar assumption also applies for LPNs and its respectively associated cells.

Figure 4:
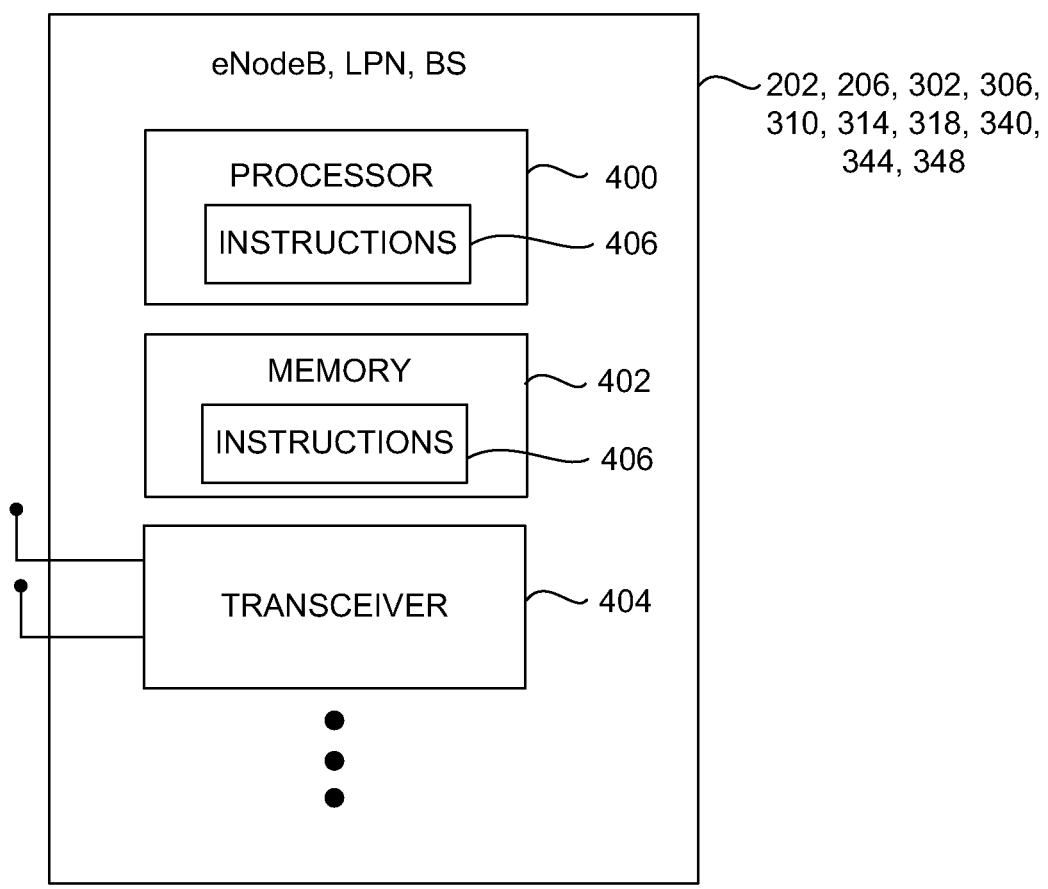
FIG. 4 illustrates an example block diagram showing details of the eNodeBs included in the wireless communications network of FIG. 2 or 3 according to some embodiments.

FIG. 4 illustrates an example block diagram showing details of each of eNodeBs 202, 206, 302, 306 and LPNs 310, 314, 318, 340, 344, 348 according to some embodiments. (The eNodeBs 202, 206, 302, 306 and LPNs 310, 314, 318, 340, 344, 348 may collectively be referred to as base stations.) Each of the eNodeBs 202, 206, 302, 306 and LPNs 310, 314, 318, 340, 344, 348 includes a processor 400, a memory 402, a transceiver 404, instructions 406, and other components (not shown). The eNodeBs 202, 206, 302, 306 and LPNs 310, 314, 318, 340, 344, 348 can be similar to each other in hardware, firmware, software, configurations, and/or operating parameters.

The processor 400 comprises one or more central processing units (CPUs), graphics processing units (GPUs), or both. The processor 400 provides processing and control functionalities for the eNodeB/LPN. Memory 402 comprises one or more transient and static memory units configured to store instructions and data for the eNodeB/LPN. The transceiver 404 comprises one or more transceivers including a multiple-input and multiple-output (MIMO) antenna to support MIMO communications. The transceiver 404 receives uplink transmissions and transmits downlink transmissions, among other things, from and to the UEs respectively.

The instructions 406 comprises one or more sets of instructions or software executed on a computing device (or machine) to cause such computing device (or machine) to perform any of the methodologies discussed herein. The instructions 406 (also referred to as computer- or machine-executable instructions) may reside, completely or at least partially, within the processor 400 and/or the memory 402 during execution thereof by the eNodeB/LPN. The processor 400 and memory 402 also comprise machine-readable media.

FIGS. 5A-5D illustrate interference analysis results for different combinations of simultaneous DL and UL transmission in adjacent channels of a simulated heterogeneous network according to some embodiments. The simulated heterogeneous network comprises 19 macro sites with each macro site including three macro cells. Further, each macro cell includes four pico and/or femto cells therein, and the assigned UL or DL transmission associated with each of the macro and pico/femto cells occurring on adjacent channels to each other. The simulation assigns all of the macro cells to synchronously operate either in the UL or DL, and for a certain number of the pico/femto cells to operate in the UL while the remaining ones operate in the DL. For example, a simulation can be conducted in which all of the macro cells operate in the DL and half of the pico/femto cells in each macro cell dynamically change from the UL to DL, or vice versa. As a system level simulation analysis conducted for DL and UL SINR geometries, the simulation takes into account typical transmission and reception parameters as well as propagation characteristics for outdoor deployment of LTE systems. It is also assumed that the system is fully loaded, e.g., all of the macro and femto/pico stations always have data for transmission. Even though adjacent channel interference is likely to be less than co-channel interference, these simulation results shed light on the conditions under which even adjacent channel interference may be significant due to different subframe configurations in neighboring cells.

Figure 5A:
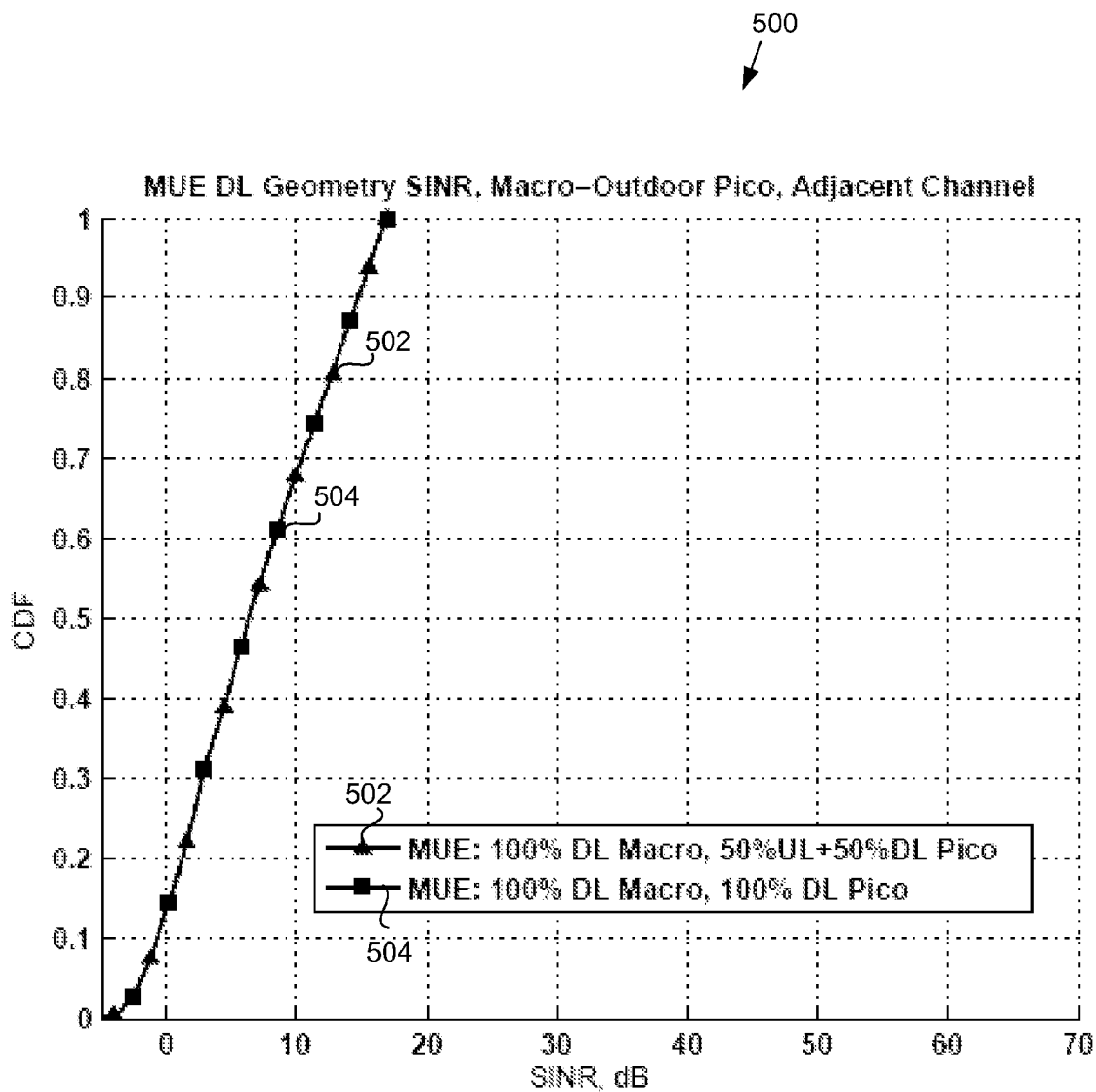
FIGS. 5A-5D illustrate interference analysis results for different combinations of simultaneous DL and UL transmission in adjacent channels of a simulated heterogeneous network according to some embodiments.

FIG. 5A illustrates a plot 500 showing the macro cell UE (MUE) DL geometry SINR of under different DL or UL transmission directions of femto/pico cell base stations operating in adjacent channels to the macro cell base stations. A plot line 502 is associated with 100% of the macro cell base stations operating in the DL transmission direction and for each macro cell, 50% of the femto/pico base stations (e.g., two femto/pico base stations) located within it operating in the UL mode and the remaining 50% of the femto/pico base stations located within it operating in the DL mode. A plot line 504 is associated with 100% of the macro base stations operating in the DL transmission direction and 100% of the femto/pico base stations also operating in the DL transmission.

As shown by the overlapping plot lines 502, 504, the distribution of UL and DL transmission directions of the femto/pico base stations has little or no impact on the macro UE DL SINR geometry. The minimal impact from the subframe configuration of the femto/pico cells is due to at least the macro and femto/pico base stations operating on adjacent or different channels to each other, and because the macro base station transmission power is much higher than the femto/pico transmission power. Plot lines 502, 504 show, for example, that at about 0.68 cumulative distribution function (CDF) the SINR is about 10 decibels (dB). This means about 68% of the MUEs in the simulation experienced an SINR of 10 dB or less.

Figure 5B:
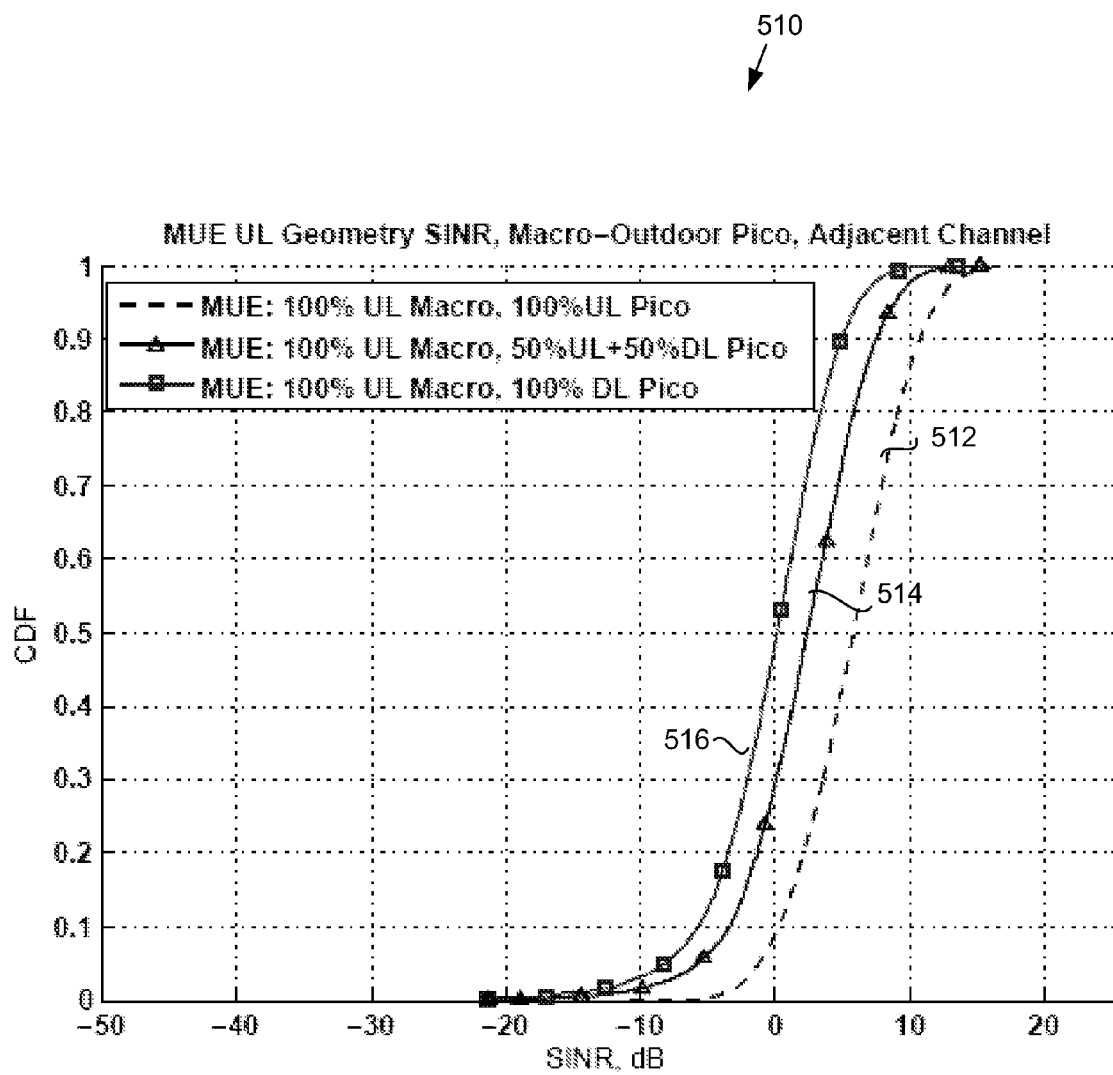

FIG. 5B illustrates a plot 510 showing the MUE UL geometry SINR for different DL or UL transmission directions of femto/pico base stations operating in adjacent channels to the macro cell base stations. A plot line 512 is associated with 100% of the macro cell base stations operating in the UL transmission direction and 100% of the femto/pico base stations also operating in the UL transmission direction. A plot line 514 is associated with 100% of the macro cell base stations operating in the UL transmission direction and for each macro cell, 50% of the femto/pico base stations (e.g., two femto/pico base stations) located within it operating in the UL mode and the remaining 50% of the femto/pico base stations located within it operating in the DL mode. A plot line 516 is associated with 100% of the macro base stations operating in the UL transmission direction and 100% of the femto/pico base stations operating in the DL transmission direction.

Plot lines 512, 514, 516 show that the impact of the femto/pico base station on MUEs' UL SINR geometry is not very significant. This is because the macro and femto/pico cells are operating on adjacent channels to each other and/or because the LPNs serving the femto/pico cells on the DL transmit at a considerably lower transmission power compared to typical macro eNodeB transmit power (contrast this to the scenario described in FIG. 5D wherein the impact of subframe configuration of the macro cell is seen to significantly impact the UL SINR at the LPNs). Among the various macro UL possibilities, the best geometry SINR distribution is observed when all of the macro and femto/pico cells are operating in the UL transmission direction (see plot line 512). Plot line 514 shows that the MUEs experience approximately a 3 to 4 dB degradation in performance when half of the femto/pico stations switch from UL to DL transmission. Plot line 516 shows the MUEs experiencing approximately a 5 to 6 dB degradation in performance when all of the femto/pico stations have the opposite transmission direction from the macro stations.

Figure 5C:
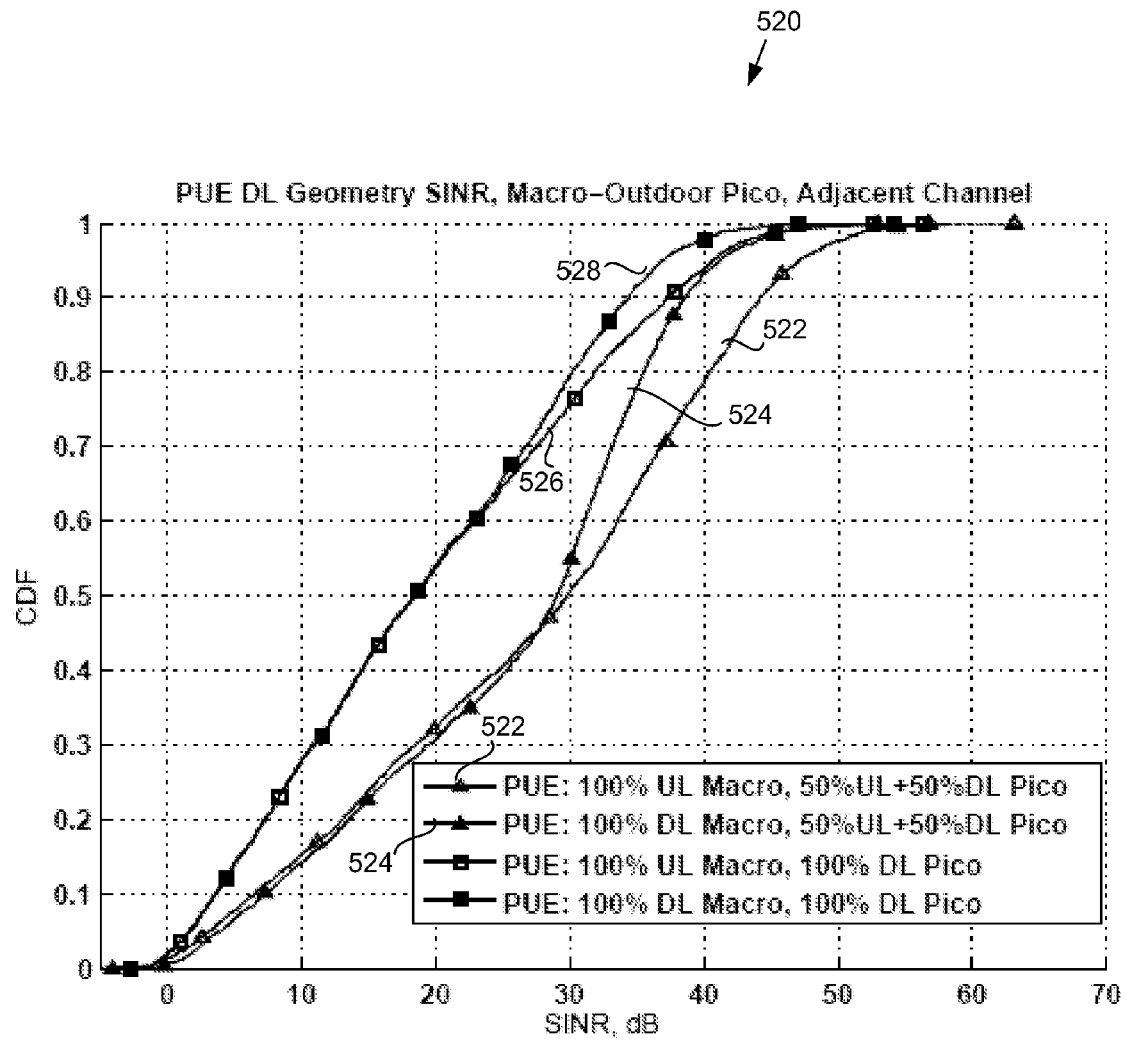

FIG. 5C illustrates a plot 520 showing the femto/pico cell UE (PUE) DL geometry SINR under various DL or UL transmission directions of the macro and femto/pico base stations operating in adjacent channels to each other. Statistics for the UEs associated with femto/pico base stations that are operating in the DL mode are shown. A plot line 522 is associated with 100% of the macro cell stations operating in the UL transmission direction and for each macro cell, 50% of the femto/pico base stations (e.g., two femto/pico base stations) located within it operating in the UL mode and the remaining 50% of the femto/pico base stations located within it operating in the DL mode. A plot line 524 is associated with 100% of the macro cell stations operating in the DL transmission direction and for each macro cell, 50% of the femto/pico base stations (e.g., two femto/pico base stations) located within it operating in the UL mode and the remaining 50% of the femto/pico base stations located within it operating in the DL mode. A plot line 526 is associated with 100% of the macro cell base stations operating in the UL transmission direction and 100% of the femto/pico base stations operating in the DL transmission direction. A plot line 528 is associated with 100% of the macro cell base stations operating in the DL transmission direction and 100% of the femto/pico base stations also operating in the DL transmission direction.

Among this set of analysis results, the best DL geometry SINR distribution is shown by plot line 522 (e.g., least amount of inter-femto/pico cell interference). Because all of the macro stations and half of the femto/pico stations are operating in the UL mode—the most number of base stations operating in the UL mode among the four transmission combinations—there is the least amount of interference to any particular DL femto/pico station that a PUE may be looking to connect to. Conversely, the worst performance is shown by plot line 528.

Figure 5D:
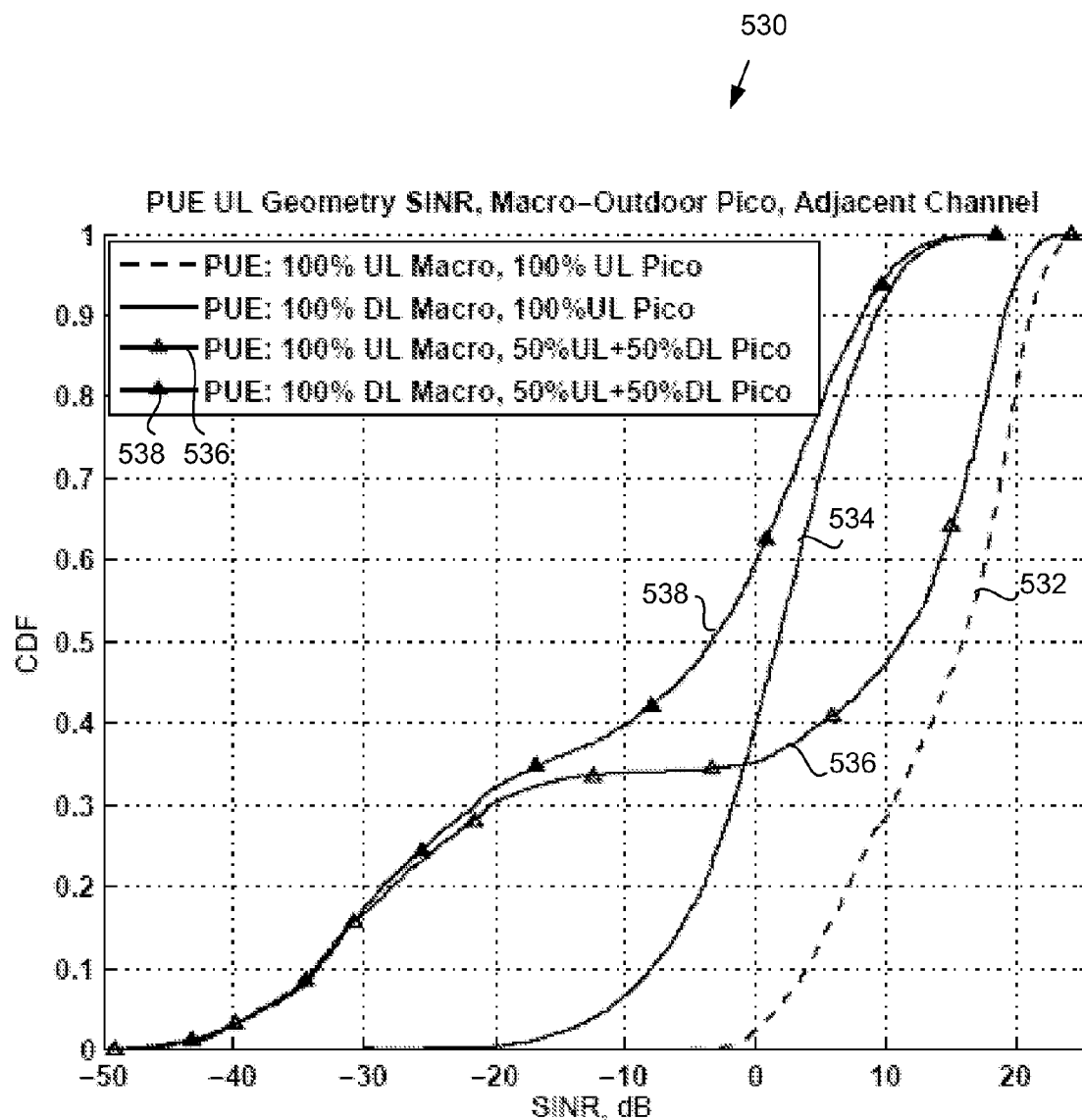

FIG. 5D illustrates a plot 530 showing the PUE UL geometry SINR under various DL or UL transmission directions of the macro and femto/pico base stations operating in adjacent channels to each other. Statistics for the UEs associated with femto/pico base stations that are operating in the UL mode are shown. A plot line 532 is associated with 100% of the macro cell stations operating in the UL mode and 100% of the femto/pico cell stations operating in the UL mode. A plot line 534 is associated with 100% of the macro cell stations operating in the DL mode and 100% of the femto/pico cell stations operating in the UL mode. A plot line 536 is associated with 100% of the macro cell stations operating in the UL transmission direction and for each macro cell, 50% of the femto/pico base stations (e.g., two femto/pico base stations) located within it operating in the UL mode and the remaining 50% of the femto/pico base stations located within it operating in the DL mode. A plot line 538 is associated with 100% of the macro cell stations operating in the DL transmission direction and for each macro cell, 50% of the femto/pico base stations (e.g., two femto/pico base stations) located within it operating in the UL mode and the remaining 50% of the femto/pico base stations located within it operating in the DL mode.

Among this set of analysis results, the best performance is shown by plot line 532, in which all of the base stations are operating in the UL mode. As the base stations change to the DL, the inter-cell interference tends to increase due to increased BS-BS interference. The greatest amount of inter-cell interference experienced by UEs associated with femto/pico stations operating in the UL mode is shown by plot line 538.

Based on the simulation analysis results shown in FIGS. 5A-5D, the following insights on the nature of and sensitivity to inter-cell interference can be obtained:

The DL geometry SINR of MUEs is insensitive to the transmission direction of the femto/pico stations operating in adjacent channels to the macro stations.

The UL geometry SINR of MUEs experiences degradation of about 3-4 dB when half of the femto/pico stations are switched from UL to DL transmission direction and of about 5-6 dB if all of the femto/pico stations have the opposite transmission direction from the macro stations.

The DL geometry SINR of PUEs is mainly limited by co-channel DL inter-cell interference from femto/pico stations and almost does not depend on the transmission direction of the macro stations. The DL SINR of PUEs improves if some of the femto/pico stations are switched from DL to UL mode.

The UL geometry SINR of PUEs is very sensitive to the transmission directions of both the macro and femto/pico stations. The UL geometry SINR significantly degrades if macro stations and/or half of the femto/pico stations have opposite transmission directions.

Accordingly, the UL SINR is highly sensitive to the DL inter-cell interference and DL SINR is improved if some of the femto/pico stations change their transmission direction to UL.

The interference mitigation or coordination scheme is configured to facilitate (and/or maximize the benefits of) dynamic traffic adaptation in multi-cell environments. Dynamic interference management among cells of a homogeneous or heterogeneous wireless communications network enables a dynamic UL/DL configuration scheme (also referred to as dynamic UL/DL re-configuration) such as that shown in FIG. 6.

Figure 6:
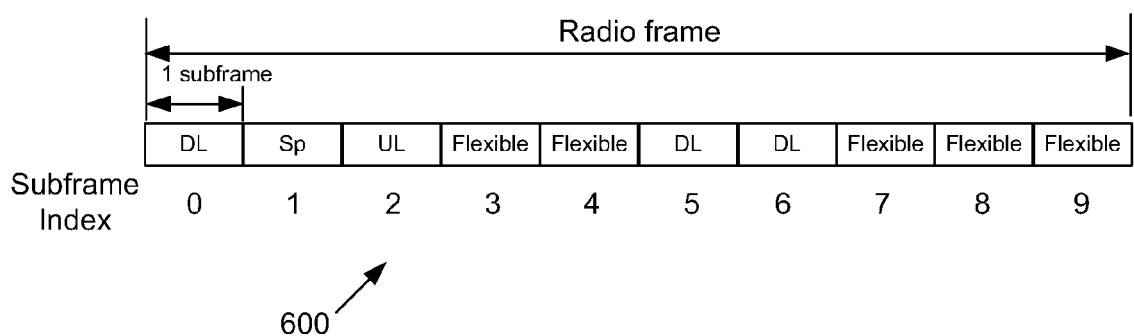
FIG. 6 illustrates a radio frame structure that supports UL/DL configuration allocation for legacy Release 8/9/10 UEs and also facilitates a dynamic UL/DL re-configuration indication mechanism for Release 11 and later UEs according to some embodiments.

FIG. 6 illustrates a radio frame structure 600 that supports UL/DL configuration allocation for legacy Release 8/9/10 UEs (in accordance with the supported UL/DL configurations shown in FIG. 1) and also facilitates a dynamic UL/DL re-configuration indication mechanism for Release 11 and later UEs (e.g., those UEs that are able to decode the dynamic UL/DL re-configuration information from its associated eNodeB/LPN) according to some embodiments. The radio frame structure 600 comprises ten subframes—denoted by subframe index 0 through 9 from left to right. Subframes 0, 5, and 6 are designated as downlink subframes; Subframe 1 is designated as a special subframe but is considered a downlink subframe for purposes of dynamic UL/DL re-configuration; Subframe 2 is designated as an uplink subframe; and Subframes 3, 4, 7, 8, and 9 are designated as flexible subframes (FlexSFs). The flexible subframes within the radio frame are designated for flexible transmission direction encoding—each of the flexible subframes can be dynamically designated a downlink or special uplink subframe for Release 11 or later UEs. The special uplink subframe includes a downlink transmission period to transmit downlink control channels, a central guard period (GP) to switch between a downlink and uplink transmission, and an uplink data transmission period. In TDD-LTE deployment, the radio frame structure 600 is 10 ms in time length and each subframe within the radio frame structure 600 is 1 ms in time length.

The radio frame structure 600 thus comprises flexible subframes and fixed subframes (also referred to as non-flexible subframes). A given flexible subframe within a radio frame can be dynamically adapted to a UL or DL subframe according to the traffic/loading condition and/or for interference management purposes. Such dynamic adaptation of flexible subframe(s) is recognized by Release 11 or later UEs but not by legacy UEs. The legacy UEs assume the flexible subframes to be DL subframes and would decode PDCCH in the flexible subframes unless explicitly instructed by its eNodeB/LPN for UL transmission. The fixed subframes, on the other hand, have fixed or semi-static UL or DL transmission direction which are not changed during dynamic UL/DL configuration in order to preserve backward compatibility with legacy UEs.

A given eNodeB/LPN (macro, femto, pico) selects from among the seven supported UL/DL configurations (see FIG. 1) and transmits the selection information via the SystemInformationBlockType1 (SIB1) information bits to all UEs associated with the eNodeB. When the eNodeB/LPN determines that the local traffic and/or interference conditions merit changing the UL/DL configuration to better handle the instantaneous traffic situation, the eNodeB/LPN can dynamically adapt the transmission direction of one or more flexible subframes of the radio frames different from the configuration specified by SIB1. The dynamic allocation of select flexible subframes (e.g., dynamic UL/DL re-configuration) is transmitted to at least the Release 11 or later UEs associated with the eNodeB. The dynamic UL/DL re-configuration information can be signaled to the UEs via higher layer signaling or can be included in a downlink control information (DCI) message, the DCI message included in a physical downlink control channel (PDCCH), and the PDCCH, in turn, included in at least one downlink subframe of a radio frame.

Before a given eNodeB decides to implement a particular dynamic UL/DL re-configuration, interference management (IM) principles or rules should be taken into account in order to avoid degrading performance instead of improving it. From the simulation analysis discussed above, it is known that (1) DL SINR is less sensitive to UL interference, and (2) UL SINR is more sensitive to DL interference (especially from DL interference caused by macro cell(s)). Based on the foregoing, the following IM principles or rules can be constructed to provide interference management while maximizing the overall system throughput, capacity, and/or overall system performance.

A given eNodeB/LPN can detect the interference associated with operating in the UL transmission direction, and for interference associated with operating in the DL transmission direction, the UEs associated with the given eNodeB/LPN can provide feedback information to its eNodeB/LPN regarding the interference experienced by the UEs for the DL subframes. For interference experienced by neighboring eNodeB(s)/LPN(s) due to the given eNodeB/LPN, the given eNodeB/LPN can receive and/or exchange interference information with other eNodeB(s)/LPN(s) via, for example, X2 interfaces or optical fiber connections.

FIG. 7A illustrates a flow diagram representative of the IM principles/rules applicable to each macro cell within a homogeneous or heterogeneous LTE-TDD network according to some embodiments (also referred to as macro cell configuration rules). A macro cell's FlexSF is operated as a DL subframe at normal transmit power level if the detrimental interference impact associated with that configuration on the neighboring cells is determined to be low. This condition is expressed at a block 702. In block 702, the following conditions are checked:

(1) a DL subframe of a given macro cell does not cause severe interference to neighboring cells—the interference level is less than a pre-determined threshold level or a similar determination can be made using information exchanged between neighboring cells, such as information regarding subframe configuration and impact from inter-cell interference between neighboring cells using, for instance, the X2 interface; or (2) a majority of the neighboring cells' (macro and/or LPN) FlexSFs are configured for DL transmission (referred to as "neighboring cells DL FlexSF" for shorthand). When the above conditions hold true (yes branch of block 702), proceed to a block 704. Otherwise (no branch of block 702), proceed to a block 708. The pre-determined threshold (interference) level may be determined in a semi-static manner based on long-term statistics or in a more dynamic fashion as well depending, for instance, on the frequency of the subframe configuration adaptations. For the UL, such metrics can also be specified in terms of interference-over-thermal (IoT) values. Further, information exchange regarding inter-cell interference levels can be exchanged by the neighboring cells over the X2 or optical fiber connections. Such information exchange may comprise of just a single flag to denote unacceptable levels of interference from a victim cell (the affected cell) to an aggressor cell (the cell causing the interference).

At the block 704, the IM principle/rule comprises configuring or allocating the flexible subframe of the radio frames for the given macro cell (referred to as "macro FlexSF" or "macro cell FlexSF" for shorthand) as a DL subframe operating at normal transmit power level. At the block 708, the IM principle/rule comprises configuring or allocating the macro FlexSF as either: (1) a DL subframe that operates at a reduced transmit power level (relative to the default, conventional, or normal power level), or (2) a UL subframe. In one embodiment, when the macro FlexSF is configured for DL subframe operating at a reduced transmit power level, the given macro cell can use such configuration to serve UEs located close to its eNodeB by applying geographical scheduling methods.

Once the macro FlexSF is determined in blocks 704 or 708, the impact of neighboring macro cell configurations are taken into account at a block 710. This may result in modifying the macro FlexSF from its current configuration and/or as determined in blocks 704 or 708. For example, if even a single macro cell changes transmission direction from DL to UL (to assist the LPN(s) within that macro cell's coverage area) while the neighboring macro cells continue to operate in the DL transmission direction, considerable (BS-to-BS) interference may still exist, especially if co-channel deployment scenarios are considered. Accordingly, coordination among neighboring macro cells is a factor in implementing effective interference management.

Additionally, at a block 712, interference mitigation scheme(s), such as enhanced inter-cell interference coordination (eICIC) or almost blank subframe (ABS), can be implemented in conjunction with the determined macro FlexSF to affect interference management. The macro cell configuration rules overall assist the LPNs by reducing the potential interference that can be caused by the macro eNodeBs.

Figure 7B:
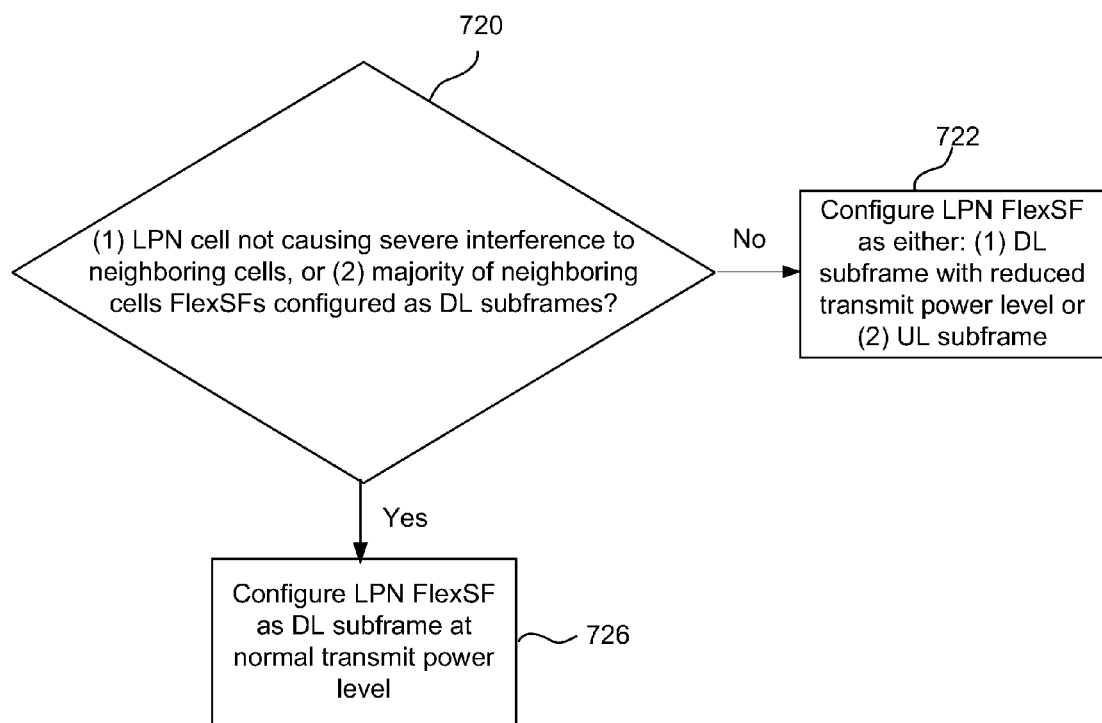

FIG. 7B illustrates a flow diagram representative of the IM principles/rules applicable to each LPN (e.g., femto or pico) cell within a homogeneous or heterogeneous LTE-TDD network according to some embodiments (also referred to as femto/pico cell configuration rules). A LPN cell's FlexSF is operated as a DL subframe at normal transmit power level if the detrimental interference impact associated with that configuration on the neighboring cells is determined to be low. This condition is expressed at a block 720. In block 720, the following conditions are checked:

(1) a DL subframe of a given LPN cell does not cause severe interference to neighboring cells—the interference level is less than a pre-determined threshold level or a similar determination can be made using information exchanged between neighboring cells, such as information regarding subframe configuration and impact from inter-cell interference between neighboring cells using, for instance, the X2 interface; or (2) a majority of the neighboring LPN cells' FlexSFs are configured for DL transmission (referred to as "neighboring cells DL FlexSF" for shorthand). When the above conditions hold true (yes branch of block 720), proceed to a block 726. Otherwise (no branch of block 720), proceed to a block 722. The pre-determined interference threshold level can be the same or different from the pre-determined interference threshold level associated with the macro cell configuration rules.

At the block 726, the IM principle/rule comprises configuring or allocating the flexible subframe of the radio frames for the given LPN cell (referred to as LPN (cell) FlexSF or femto/pico (cell) FlexSF for shorthand) as a DL subframe operating at a normal transmit power level. At the block 722, the IM principle/rule comprises configuring or allocating the LPN FlexSF as either: (1) a DL subframe that operates at a reduced transmit power level (relative to the default, conventional, or normal power level), or (2) a UL subframe. In one embodiment, when the LPN FlexSF is configured for DL subframe operating at a reduced transmit power level, the given LPN cell can use such configuration to serve UEs located close to its LPN by applying geographical scheduling methods.

Figure 8A:
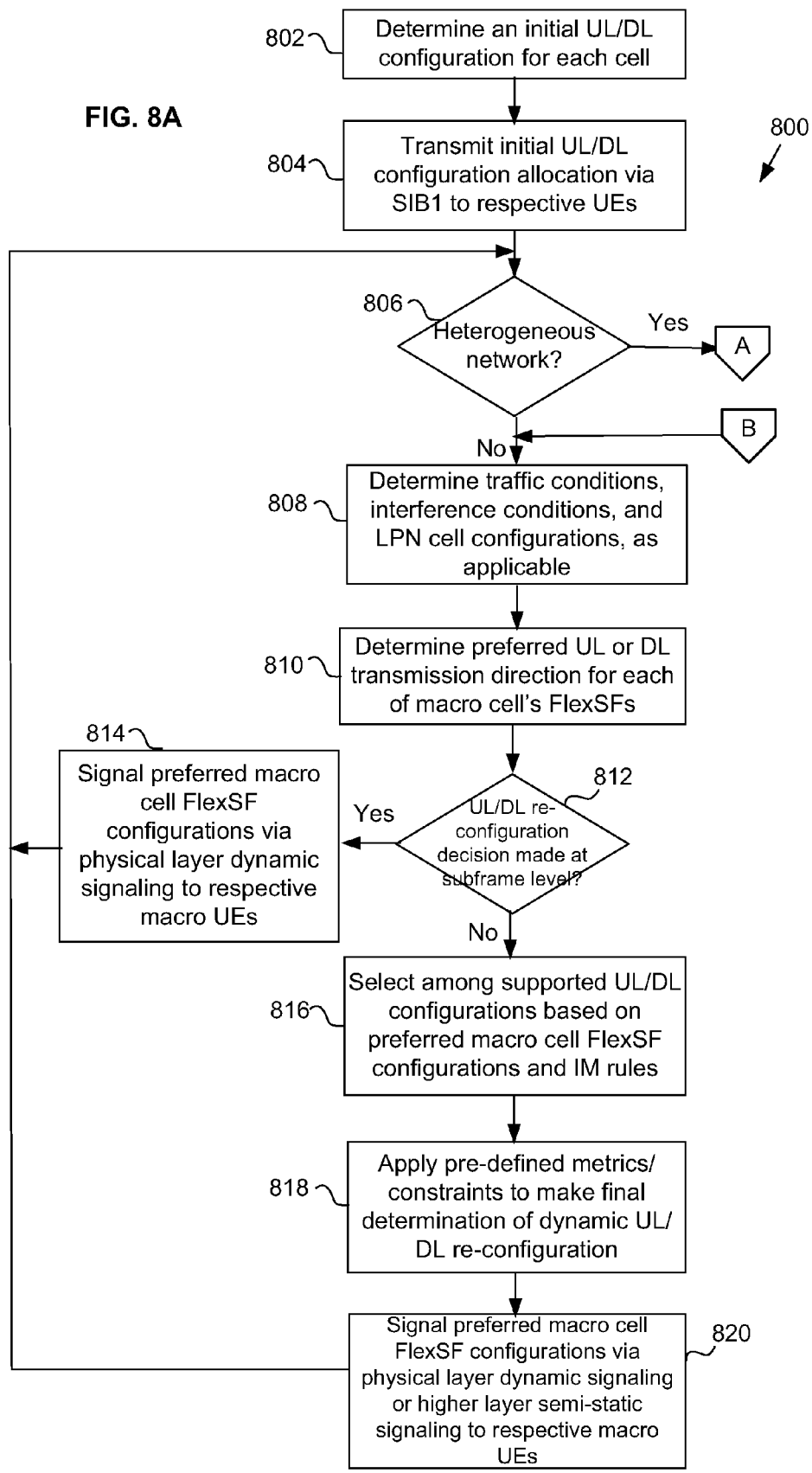
FIGS. 8A-8B illustrate an example flow diagram for implementing the IM principles/rules of FIGS. 7A-7B to enable dynamic UL/DL re-configuration using flexible subframes according to some embodiments.
Figure 8B:
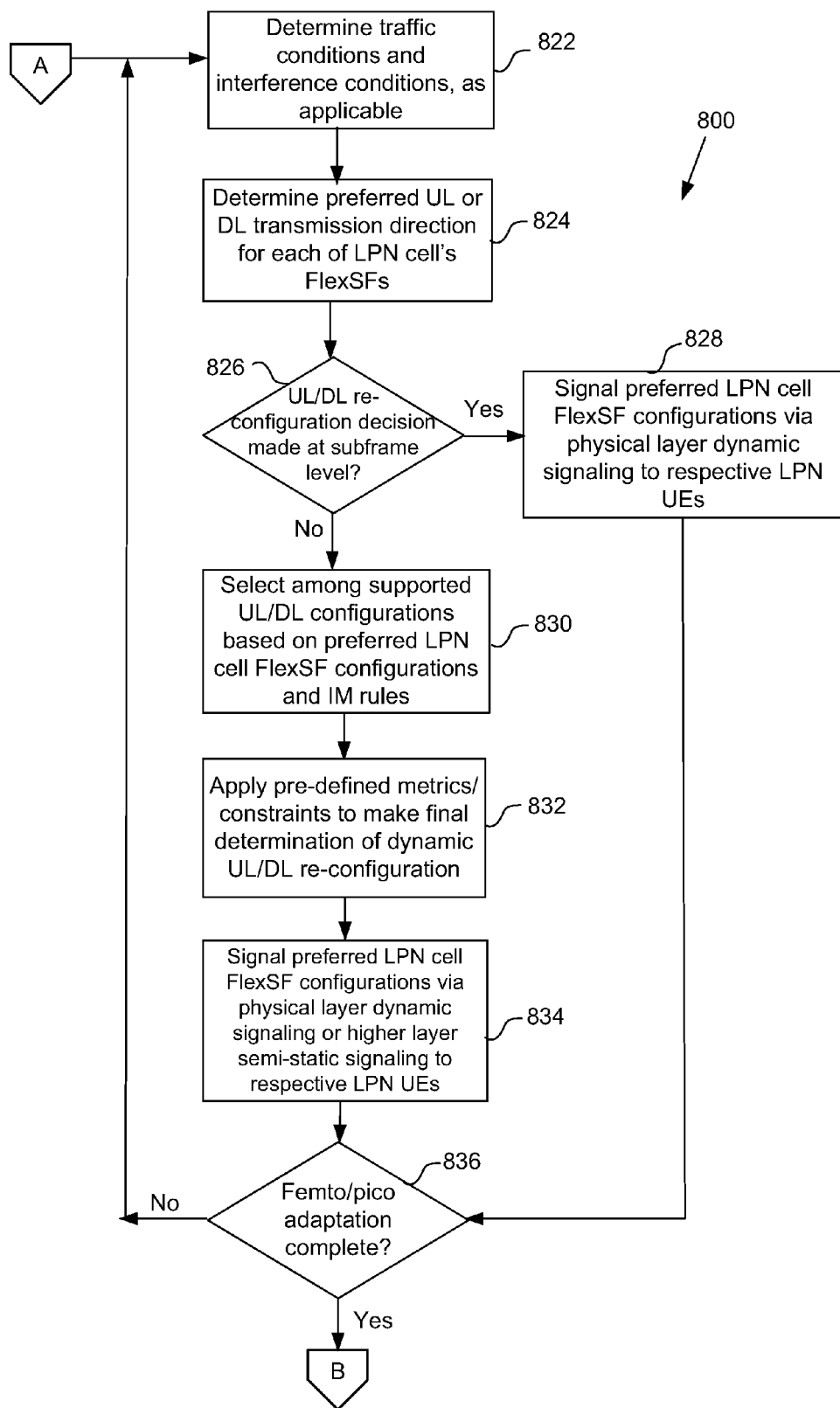

FIGS. 8A-8B illustrate an example flow diagram 800 for implementing the IM principles/rules of FIGS. 7A-7B to enable dynamic UL/DL re-configuration using flexible subframes according to some embodiments. At a block 802, the eNodeB/LPN associated with each macro, LPN, femto, pico, etc. cell within the wireless communications network (e.g., network 200 and/or 300) determines the initial UL/DL configuration allocation for its respective cell. In one embodiment, each of the initial UL/DL configurations is selected from among the supported UL/DL configurations provided in FIG. 1. Once the respective initial UL/DL configuration allocations have been determined, each of the eNodeBs/LPNs transmits its UL/DL configuration allocation via SIB1 to its UEs (block 804). Accordingly, the legacy Release 8/9/10 UEs as well as the Release 11 and later UEs within a given cell communicates with the associated eNodeB using the same UL/DL configuration.

If the wireless communications network comprises a homogeneous network (no branch of block 806), then adaptation of the subframe configuration for the macro cells (referred to as macro adaptation), shown in blocks 808-820, is implemented. In one embodiment, macro eNodeBs may independently perform macro adaptation for each macro cell. In another embodiment, more than one macro cell (e.g., a group of cells based on coverage area) may perform macro adaptation in coordination and synchronization with each other. Accordingly, blocks 808-820 will be discussed below in the context of independent macro adaptation to simplify discussion; however, it is understood that blocks 808-820 can also apply to the adaptation performed with coordination between multiple macro cells.

At a block 808, a macro eNodeB determines the traffic conditions, interference conditions, and LPN cell configurations within its coverage area (in the case of a heterogeneous network), as applicable. The macro eNodeB can perform self-measurements, obtain information from its UEs, obtain information from neighboring eNodeBs/LPNs (in heterogeneous networks), and/or conduct other measurements and requests for information in order to determine the current operating state. Next at a block 810, the macro eNodeB determines the preferred UL or DL transmission direction for each of the FlexSFs in a radio frame in accordance with the traffic conditions, interference conditions, LPN cell configurations within its coverage area, and macro IM principles/rules of FIG. 7A. The determination aims to achieve better handling of the instantaneous traffic load within the macro eNodeB's coverage area without inadvertently causing adverse inter-cell interference to neighboring cells(s) (macro and/or LPN) and/or UEs.

If the dynamic UL/DL re-configuration is to be made at the subframe level (yes branch of block 812), then the macro eNodeB transmits a dynamic UL/DL re-configuration allocation comprising the preferred UL or DL transmission direction for each of the FlexSFs in a radio frame determined in block 810 to the UEs associated with the given macro cell (block 814). The transmission comprises a dynamic signaling mechanism other than SIB1. In one embodiment, the allocation is specified in a DCI message included in a PDCCH, and the PDCCH, in turn, being included in at least one downlink subframe of a radio frame (e.g., physical layer dynamic signaling). Deciding dynamic UL/DL re-configuration at the subframe level provides the maximum flexibility in adapting subframe configurations according to instantaneous traffic and interference conditions in a cell.

Otherwise the dynamic UL/DL re-configuration is to be made on a frame level (no branch of block 812) and the macro eNodeB selects from among the supported UL/DL configurations (see FIG. 1) in accordance with the preferred UL or DL transmission direction for each of the FlexSFs in a radio frame determined in block 810 and the macro IM principles/rules of FIG. 7A (block 816). The macro eNodeB also applies, at a block 818, one or more pre-defined metrics or constraints during the selection of the dynamic UL/DL re-configuration at the frame level. For example, a pre-defined metric/constraint may not permit changing an initial DL subframe to a UL subfame because of the timing relationship associated with certain subframe resources (e.g., timing relationship between physical uplink shared channel (PUSCH) resources, physical HARQ-ACK indicator channel (PHICH) resources) and/or the impact on backward compatibility to legacy UEs. Depending on the pre-defined metrics/constraints, the final dynamic UL/DL re-configuration allocation may or may not satisfy all of the preferred FlexSF transmission directions. It is also contemplated that block 818 can occur prior to or simultaneously with block 816.

Next at a block 820, the macro eNodeB transmits the decided dynamic UL/DL re-configuration allocation to at least the Release 11 or later UEs (or UEs that are capable of recognizing the dynamic UL/DL re-configuration allocation) via radio frames(s). In one embodiment, the allocation information is signaled via higher layer semi-static signaling (e.g., semi-static RRC signaling) or physical layer dynamic signaling (e.g., in a DCI message included in a PDCCH, in which the PDCCH is included in at least one subframe of a radio frame). Determining dynamic UL/DL re-configurations at the frame level comprises a less aggressive adaptation than on a subframe level. Frame level adaptation also tends to occur on a slower time scale than subframe level adaptation.

After the dynamic UL/DL re-configuration allocation is provided to the UEs associated with the particular macro cell (blocks 814, 820), flow diagram 800 returns to block 806. If the network is a homogenous network (no branch of block 806), then macro cell adaptation repeats, as needed, at blocks 808-820.

Returning to block 806, if the wireless communications network comprises a heterogeneous network (yes branch of block 806), then subframe configuration adaptation for LPN cells (referred to as LPN (cell) adaptation or femto/pico (cell) adaptation) occurs prior to macro (cell) adaptation. Femto/pico (cell) adaptation (also referred to as local (cell) adaptation or small (cell) adaptation) comprises blocks 822-836. In one embodiment, a LPN may independently perform femto/pico adaptation. In another embodiment, more than one LPN (e.g., a group of LPNs based on coverage area) may perform femto/pico adaptation in coordination and synchronization with each other. Accordingly, blocks 822-836 will be discussed below in the context of independent femto/pico adaptation to simplify the discussion; however, it is understood that blocks 822-836 can also apply to adaptation performed with coordination between multiple LPN cells.

At block 822, a LPN determines the (local) traffic conditions and interference conditions, as applicable. The LPN can perform self-measurements, obtain information from its UEs, obtain information from neighboring eNodeBs/LPNs, and/or conduct other measurements and requests for information in order to determine the current operating state. Next at a block 824, the LPN determines the preferred UL or DL transmission direction for each of the FlexSFs in a radio frame in accordance with the traffic conditions, interference conditions, and femto/pico IM principles/rules of FIG. 7B. The determination aims to achieve better handling of the instantaneous traffic load within the LPN's coverage area without inadvertently causing adverse inter-cell interference to neighboring cells(s) (macro and/or LPN) and/or UEs.

If the dynamic UL/DL re-configuration is to be made at the subframe level (yes branch of block 826), then the LPN transmits a dynamic UL/DL re-configuration allocation comprising the preferred UL or DL transmission direction for each of the FlexSFs in a radio frame determined in block 824 to the UEs associated with that LPN (block 828). The transmission comprises a dynamic signaling mechanism other than SIB1. In one embodiment, the allocation is signaled to the UEs in a DCI message included in a PDCCH, and the PDCCH, in turn, being included in at least one downlink subframe of a radio frame (e.g., physical layer dynamic signaling). Deciding dynamic UL/DL re-configuration at the subframe level provides the maximum flexibility in adapting subframe configurations according to instantaneous traffic and interference conditions in a cell.

Otherwise the dynamic UL/DL re-configuration is to be made on a frame level (no branch of block 826) and the LPN selects from among the supported UL/DL configurations (see FIG. 1) in accordance with the preferred UL or DL transmission direction for each of the FlexSFs in a radio frame determined in block 824 and the femto/pico IM principles/rules of FIG. 7B (block 830). The LPN also applies, at a block 832, one or more pre-defined metrics or constraints during the selection of the dynamic UL/DL re-configuration at the frame level. For example, a pre-defined metric/constraint may not permit changing an initial DL subframe to a UL subfame because of the timing relationship associated with certain subframe resources (e.g., timing relationship between PUSCH resources and PHICH resources) and/or the impact on backward compatibility to legacy UEs. Depending on the pre-defined metrics/constraints, the final dynamic UL/DL re-configuration allocation may or may not satisfy all of the preferred FlexSF transmission directions. It is also contemplated that block 832 can occur prior to or simultaneously with block 830.

Next at a block 834, the LPN transmits the decided dynamic UL/DL re-configuration allocation to at least the Release 11 or later UEs (or UEs that are capable of recognizing the dynamic UL/DL re-configuration allocation) via radio frames(s). In one embodiment, the allocation information is signaled via higher layer semi-static signaling (e.g., semi-static RRC signaling) or physical layer dynamic signaling (e.g., in a DCI message included in a PDCCH, in which the PDCCH is included in at least one downlink subframe of a radio frame). Determining dynamic UL/DL re-configurations at the frame level comprises a less aggressive adaptation than on a subframe level. Frame level adaptation also tends to occur on a slower time scale than subframe level adaptation.

After the dynamic UL/DL re-configuration allocation is provided to the UEs associated with the particular LPN (blocks 828, 834), femto/pico adaptation can take place, as needed, for another LPN and/or a LPN that has previously implemented femto/pico adaptation (no branch of block 836 returning to block 822). Conversely, if femto/pico adaptation is complete (yes branch of block 836), then macro adaptation can commence at block 808.

Femto/pico adaptation can be performed for a smaller coverage area with a relative faster adaptation rate than macro adaptation. Among other things, macro adaptation could potentially have a larger interference impact than femto/pico adaptation. For instance, macro adaptation performed by even a single macro eNodeB can create interference for LPN cell(s) located within its coverage area, LPN cells(s) located within neighboring macro cell coverage area(s), and/or neighboring macro cell(s). Macro adaptation tends to depend upon neighboring macro cell configurations. In certain embodiments, all of the macro cells within the wireless communications network may be required to coordinate and synchronize their frame configurations with each other, for which case, a slow adaptation rate or resembling a semi-static adaptation rate may be used.

Accordingly, interference management principles/rules are implemented during UL/DL re-configuration determination to facilitate dynamic adjustment of the UL or DL transmission direction of pre-designated subframe(s) within a radio frame—referred to as flexible subframe(s)—at a subframe and/or frame level according to some embodiments. The interference management principles/rules are based, at least in part, on analysis showing that DL SINR is less sensitive to UL interference and UL SINR is more sensitive to DL interference (especially DL interference caused by macro cell(s)).

A new radio frame structure is defined that includes one or more flexible subframes. One or more of such flexible subframes is dynamically switched from being an uplink subframe to a downlink subframe, or vice versa, within a radio frame time period. The new UL/DL configuration defined by the dynamically switched flexible subframe(s) can be identified using a configuration indication field (CIF) value. A new DCI message format is defined to include the CIF value indicative of the new UL/DL configuration. The DCI message including the CIF value is transmitted in the PDCCH region within the control region of the downlink subframe(s). The CIF indication scheme is recognizable by Release 11 or later UEs associated with the given eNodeB/LPN, while the legacy UEs (e.g., Release 8/9/10 UEs) associated with the given eNodeB/LPN continue to operate according to the UL/DL configuration allocated using SIB1.

The term "machine-readable medium," "computer readable medium," and the like should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

It will be appreciated that, for clarity purposes, the above description describes some embodiments with reference to different functional units or processors. However, it will be apparent that any suitable distribution of functionality between different functional units, processors or domains may be used without detracting from embodiments of the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the scope of the invention.

What is claimed is:

1. A method for managing interference to facilitate allocation of a dynamic uplink and downlink ratio configuration, the method comprising:

determining, for a first cell associated with an enhanced node B (eNodeB) or a low power node (LPN), whether the first cell causes interference less than a pre-determined threshold level to one or more neighboring cells or whether flexible subframes of radio frames associated with the one or more neighboring cells operate as downlink subframes; and in response to the determining condition being met, allocating a first flexible subframe of a first radio frame associated with the first cell to operate as a downlink subframe at normal transmit power level, wherein the first flexible subframe comprises a pre-defined subframe of the first radio frame corresponding to the dynamic uplink and downlink ratio configuration;

determining, by the eNB or LPN for the first cell, whether second flexible subframes of radio frames associated with the one or more neighboring cells operate as downlink subframes; and in response to the determining condition not being met, allocating, by processing circuitry of the eNB or LPN, a second flexible subframe of a second radio frame associated with the first cell to operate as an uplink subframe, wherein the second flexible subframe comprises the pre-defined subframe of the second radio frame corresponding to the dynamic uplink and downlink ratio configuration.

2. The method of claim 1, wherein the first cell comprises a macro cell and is associated with a macro eNodeB, and the first flexible subframe operates as a downlink subframe during the interference and further comprising determining the dynamic uplink and downlink ratio configuration at least in accordance with the allocation of the first flexible subframe and a uplink and downlink ratio configuration associated with each of the one or more neighboring cells.

3. The method of claim 1 further comprising, in response to the determining condition not being met based on a determination that 1) the downlink interference caused by the cell to one or more neighboring cells exceeds the pre-determined threshold level, and 2) less than a majority of flexible subframes in neighboring cells are defined as DL subframes:

allocating the first flexible subframe of a first radio frame associated with the first cell to operate as a downlink subframe at reduced power level that is less than the normal power level.

4. The method of claim 1, further comprising determining whether flexible subframes of radio frames associated with the one or more neighboring cells operate as downlink subframes by communicating with the one or more neighboring cells via an X2 interface.

5. The method of claim 1 further comprising:

transmitting an uplink-downlink configuration for time division duplex (TDD) to user equipment (UEs) within a cell of the eNB via System Information Block Type 1 (SIB1); and communicating allocation of the first flexible subframe to the cell of the eNB via RRC signaling.

6. The method of claim 1, further comprising, in response to the determining condition not being met, allocating the first flexible subframe of the first radio frame associated with the first cell to operate as a downlink subframe at reduced transmit power level.

7. The method of claim 1, further comprising, in response to the determining condition not being met, allocating the first flexible subframe of the first radio frame associated with the first cell to operate as an uplink subframe.

8. An apparatus of an eNodeB operating in an evolved universal terrestrial radio access network (EUTRAN) for uplink downlink configuration, the apparatus comprising:
   memory; and
   processing circuitry, configured to:
      determine whether interference caused by the cell is less than a pre-determined threshold level to one or more neighboring cells or whether flexible subframes of radio frames associated with the one or more neighboring cells operate as downlink subframes; and
      configure a first flexible subframe of a first radio frame associated with the cell as one of a downlink subframe operating in a reduced transmit power level or as an uplink subframe, in response to a determination that the threshold level is met; wherein the first flexible subframe comprises a pre-defined subframe of the first radio frame corresponding to a dynamic uplink and downlink configuration;
      determine whether second flexible subframes of radio frames associated with the one or more neighboring cells operate as downlink subframes; and
      in response to the determining condition not being met, configure a second flexible subframe of a second radio frame associated with the first cell to operate as an uplink subframe, wherein the second flexible subframe comprises the pre-defined subframe of the second radio frame corresponding to the dynamic uplink and downlink ratio configuration.

9. The apparatus of claim 8, wherein the processing circuit is further configured to determine whether flexible subframes of radio frames associated with the one or more neighboring cells operate as downlink subframes by communicating with the one or more neighboring cells via an X2 interface.

10. The apparatus of claim 8 wherein the processing circuitry is further configured to:
   initiate transmission of an uplink-downlink configuration for time division duplex (TDD) to user equipment (UEs) within a cell of the eNB via System Information Block Type 1 (SIB1); and
   initiate transmission of an allocation of the first flexible subframe to the cell of the eNB via radio resource control (RRC) signaling.

11. The apparatus of claim 8, wherein the cell comprises a macro cell; and
   wherein the transceiver configures the first flexible subframe to operate as the downlink subframe at normal transmit power level in response to the determination by the processor being affirmative and in coordination with uplink and downlink configurations associated with neighboring macro eNodeBs.

12. The apparatus of claim 8, wherein the transceiver configures the first flexible subframe to operate as the downlink subframe at normal transmit power level in response to the determination by the processor being affirmative with or without use of other interference mitigation techniques.

13. The apparatus of claim 8, wherein the transceiver signals the dynamic uplink and downlink configuration to user equipment (UEs) associated with the cell without using system information block 1 (SIB1), the dynamic uplink and downlink configuration including information about the allocated first flexible subframe.

14. The apparatus of claim 8, wherein the first radio frame comprises ten subframes that are identifiable by subframe index numbers 0 through 9 from left to right, the first flexible subframe comprising one or more subframe corresponding to the subframe index number 3, subframe index number 4, subframe index number 7, subframe index number 8, or subframe index number 9.

15. The base station of claim 8, wherein the processor performs the determination on a subframe level basis.

16. The base station of claim 8, wherein the processor performs the determination on a radio frame level basis.

17. The base station of claim 8, wherein the first flexible subframe configured as the uplink subframe includes a downlink transmission period to transmit downlink control channels, a central guard period (GP) to switch between a downlink and uplink transmission, and an uplink data transmission period.

18. A non-transitory computer readable medium including instructions, when executed by one or more processors of an evolved node B (eNB), causes the eNB to:
   determine, for a first cell associated with an enhanced node B (eNodeB) or a low power node (LPN), whether the first cell causes interference less than a pre-determined threshold level to one or more neighboring cells or whether flexible subframes of radio frames associated with the one or more neighboring cells operate as downlink subframes;
   in response to the determining condition being met, allocate a first flexible subframe of a first radio frame associated with the first cell to operate as a downlink subframe at normal transmit power level;
   determining, by the eNB whether second flexible subframes of radio frames associated with the one or more neighboring cells operate as downlink subframes; and
   in response to the determining condition not being met, allocating, by processing circuitry of the eNB or LPN, a second flexible subframe of a second radio frame associated with the first cell to operate as an uplink subframe, wherein the second flexible subframe comprises the pre-defined subframe of the second radio frame corresponding to the dynamic uplink and downlink ratio configuration.

19. The non-transitory computer readable medium of claim 18, wherein the instructions further configure the eNB to determine whether flexible subframes of radio frames associated with the one or more neighboring cells operate as downlink subframes by communicating with the one or more neighboring cells via an X2 interface.

20. The non-transitory computer readable medium of claim 18 wherein the instructions further configure the eNB to:
   initiate transmission of an uplink-downlink configuration for time division duplex (TDD) to user equipment (UEs) within a cell of the eNB via System Information Block Type 1 (SIB1); and
   initiate transmission of an allocation of the first flexible subframe to the cell of the eNB via radio resource control (RRC) signaling.

* * * * *